Sept. 8, 1970 J. D. JOHNSON 3,528,068
DEVICE FOR CONVERTING BINARY CODED DIGITAL INFORMATION
TO SYMBOL FORM FOR VIDEO DISPLAY
Filed Feb. 24, 1967 4 Sheets-Sheet 1

INVENTOR
JAMES D. JOHNSON
BY
ATTORNEY

Sept. 8, 1970 J. D. JOHNSON 3,528,068

DEVICE FOR CONVERTING BINARY CODED DIGITAL INFORMATION TO SYMBOL FORM FOR VIDEO DISPLAY

Filed Feb. 24, 1967 4 Sheets-Sheet 3

INVENTOR
JAMES D. JOHNSON
BY [signature]
ATTORNEY

DEVICE FOR CONVERTING BINARY CODED DIGITAL INFORMATION TO SYMBOL FORM FOR VIDEO DISPLAY

Filed Feb. 24, 1967

INVENTOR
JAMES D. JOHNSON
BY
ATTORNEY

INVENTOR
JAMES D. JOHNSON
BY [signature]
ATTORNEY

United States Patent Office 3,528,068

Patented Sept. 8, 1970

3,528,068 DEVICE FOR CONVERTING BINARY CODED DIGITAL INFORMATION TO SYMBOL FORM FOR VIDEO DISPLAY

James D. Johnson, Inglewood, Calif., assignor to Computer Communication, Inc., a corporation of California Filed Feb. 24, 1967, Ser. No. 618,496
Int. Cl. G09f *9/00;* H01j *31/10*
U.S. Cl. 340—324 8 Claims

ABSTRACT OF THE DISCLOSURE

Symbol information is stored in binary coded form in a high speed random access memory. This information is transferred to a symbol generator device which converts the information into dot patterns forming the symbols for display on a high speed linear scan video display device such as that used in a television receiver.

Figure 1:
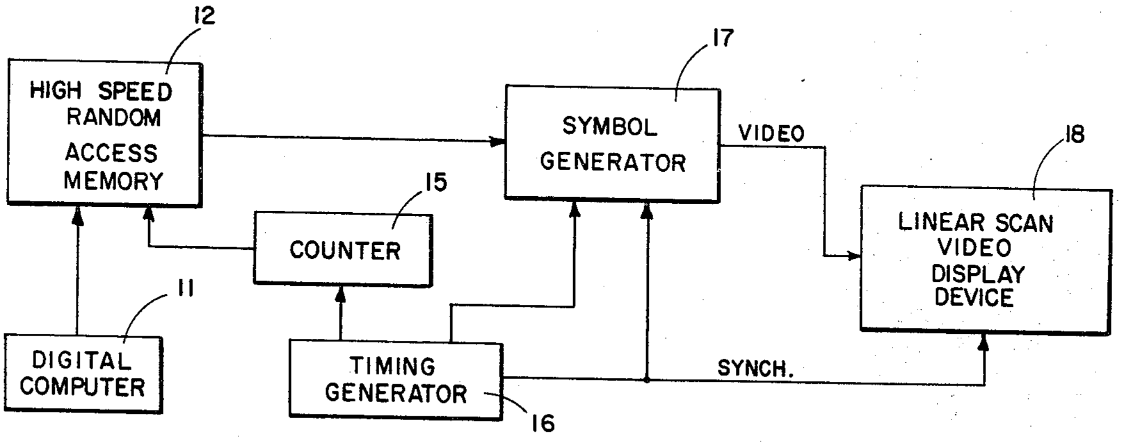

This invention relates to a device for converting digital information from binary form to symbol form, and more particularly to a device for processing symbol information stored in digital form in a high speed random access memory so that it is suitable for display on an ordinary television receiver.

The output information of digital computers is often stored in a memory device and read out from such device onto a cathode ray tube display. Prior art cathode ray tube display devices for this purpose are generally specially constructed units utilizing relatively slow speed scanning in which the scanning beam is deflected or bent to form the symbols to be displayed in accordance with the memory output. Such display devices are relatively expensive and are generally only suitable for the particular readout functions for which they are designed. Hence the number of such units that can be made available with a given computer system is generally limited by economic considerations. Television receivers are relatively inexpensive and usually available in commercial and industrial installations for closed circuit television display and the like. The output information of a computer as handled in the prior art for video display is not suitable, however, for display on the screen of an ordinary television receiver in view of the relatively high speed linear scan utilized in television apparatus. This is as contrasted with the slow speed scanning techniques utilized in prior art digital computer display devices.

The device of this invention provides means for processing the output of a digital computer so that it is converted to a form suitable for display on the screen of an ordinary television receiver. This end result is achieved without any modification to the existing circuitry of such receiver. The display achieved has excellent definition characteristics comparable to that achieved with prior art display devices. Thus, the device of the invention obviates the necessity for purchasing special video display equipment for digital computers and enables the dual purpose utilization of economical and readily available television receivers for both this function as well as their ordinary functions in receiving television signals.

The device of the invention accomplishes this end result by first storing the symbol information to be displayed in a high speed random access memory, such information being in binary coded form. This binary coded information is read sequentially out of the memory into a symbol generator where it is translated into a series if linear dot patterns, a predetermined number of lines of such dot patterns representing the symbols to be displayed. The symbol generator is synchronized with the television cathode ray tube scan so that the dot pattern output which is fed to the video circuits of the receiver appear on the cathode ray tube in appropriate positions on the scanning raster. The symbol generator forms the dot patterns of each line of the symbols in a row in sequence, appropriate gating circuitry being utilized in conjunction with a magnetic readout core to display the proper dot patterns at the appropriate times.

It is therefore an object of this invention to enable the display of the output of a digital computer on an ordinary television receiver.

It is a further object of this invention to provide a more economical video display of digital information than heretofore available.

It is still another object of this invention to make possible the more widespread video display of digital information.

It is still another object of this invention to obviate the necessity for utilizing a special purpose video display device for displaying the output of a digital computer.

Figure 5:
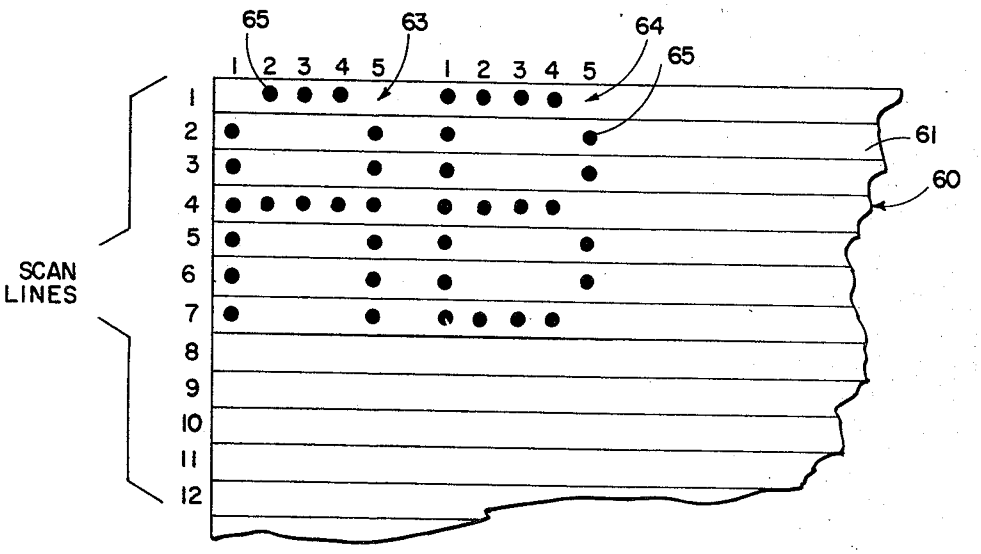
Figure 3:
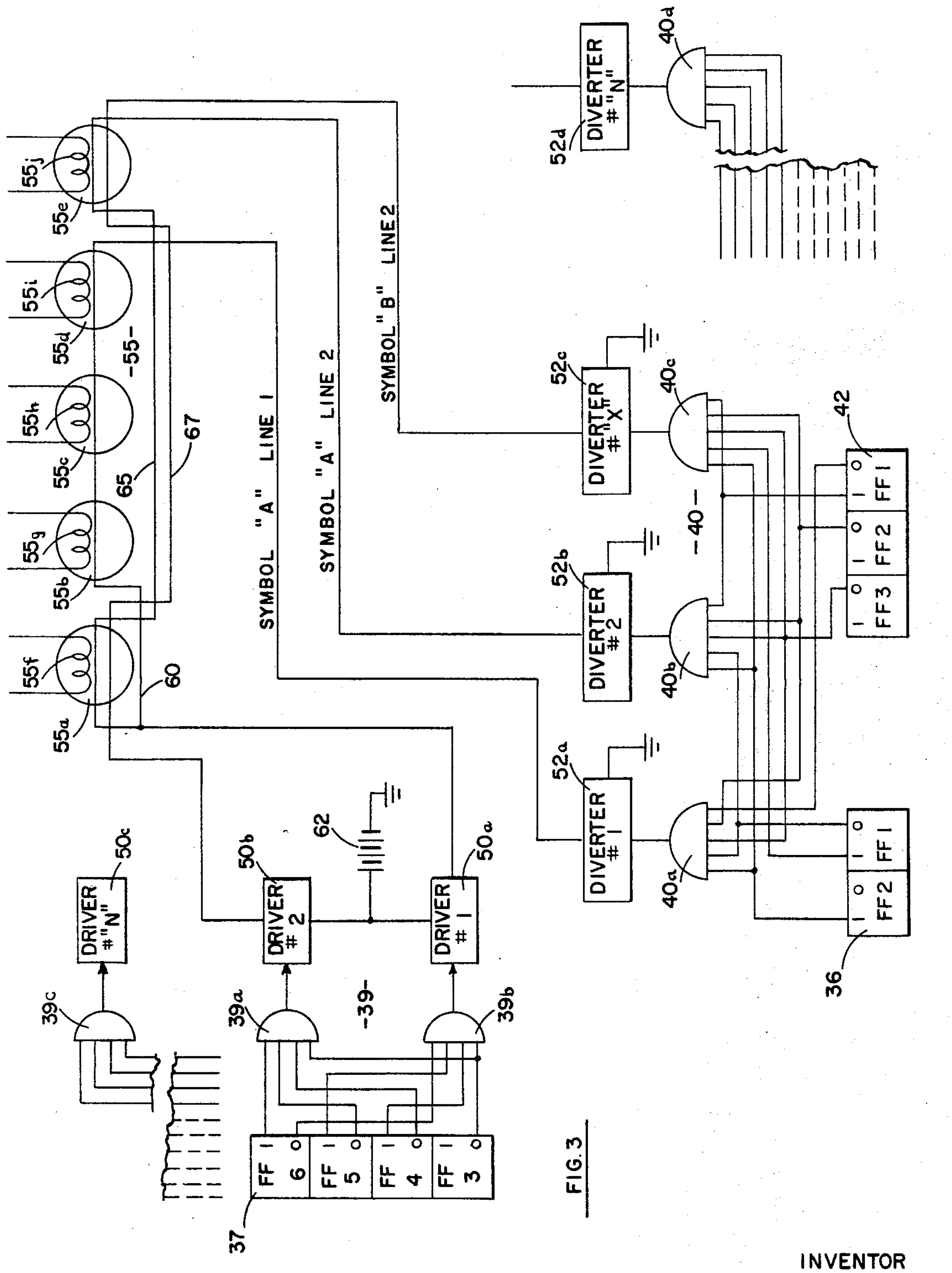
Figure 2:
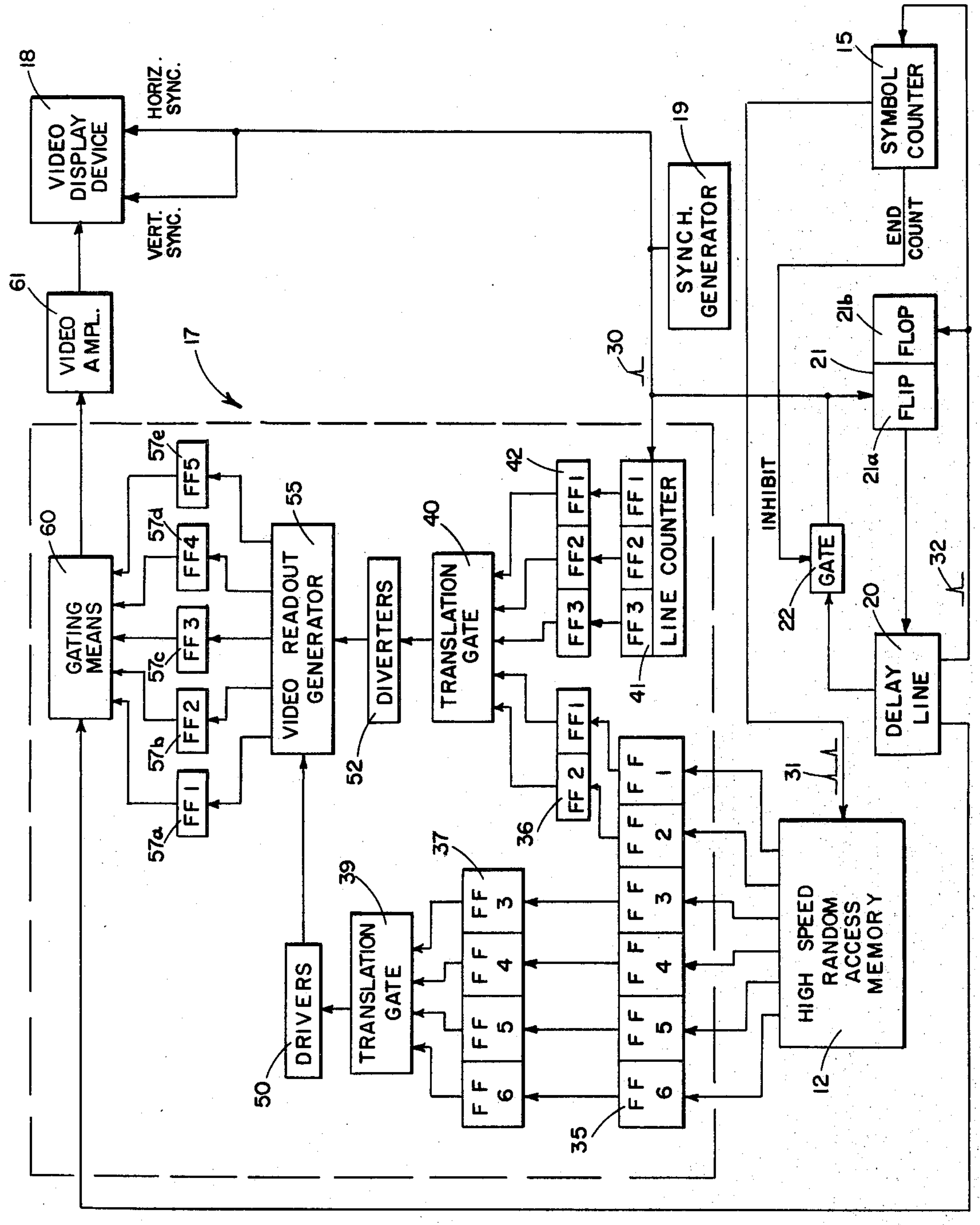
Figure 4:
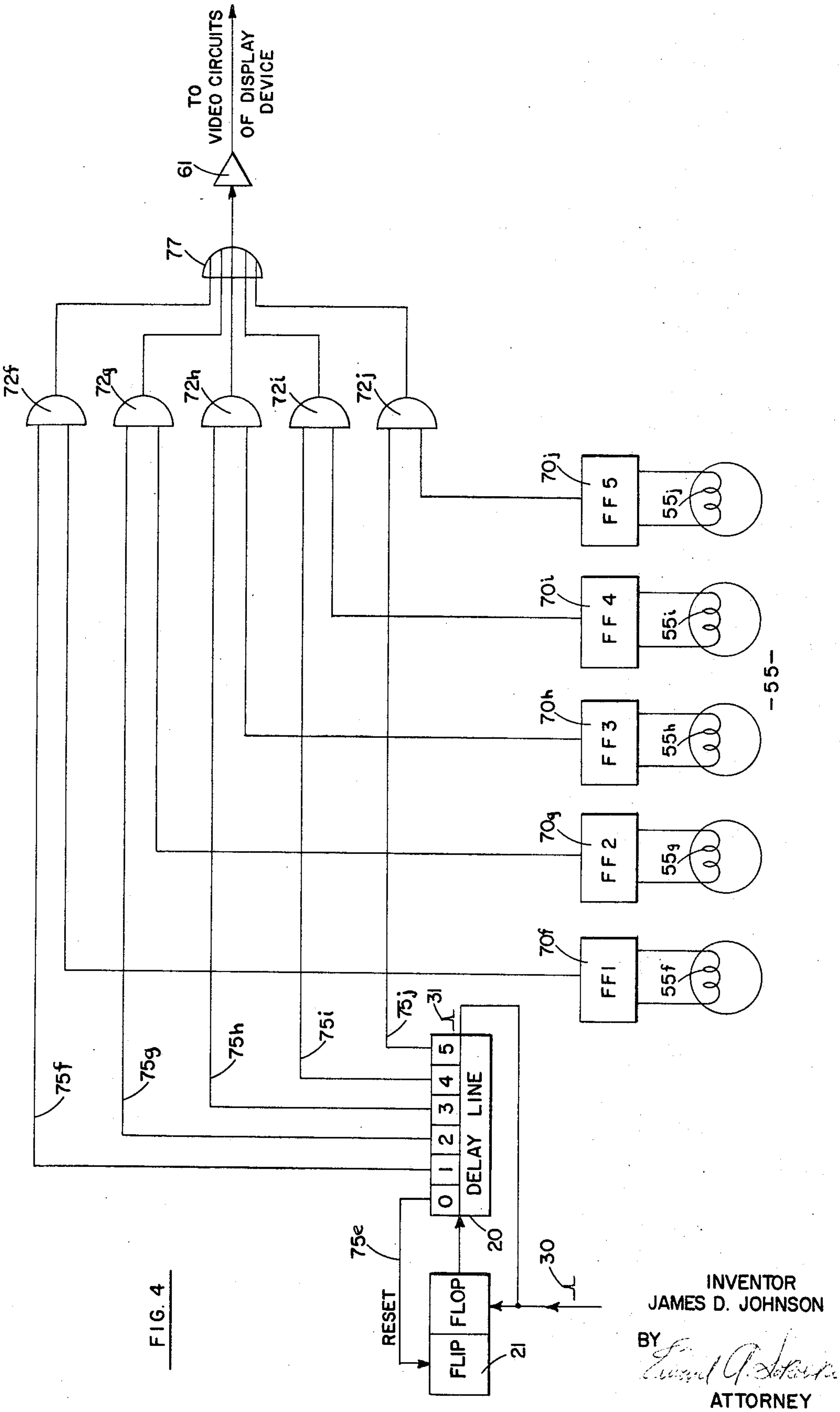

Other objects of this invention will become apparent from the following description taken in connection with the accompanying drawings, of which:

FIG. 1 is a functional block diagram illustrating the basic elements of the system of this invention, FIG. 2 is a functional block diagram illustrating a preferred embodiment of the system of this invention, FIG. 3 is a schematic drawing illustrating the operation of a preferred embodiment of translation gating and drive circuitry which may be utilized in the system of the invention, FIG. 4 is a schematic drawing illustrating a preferred embodiment of a video readout generator which may be utilized in the system of the invention, and FIG. 5 is a drawing illustrating the dot pattern of the display generated by the system of the invention.

Referring now to FIG. 1, a drawing illustrating the basic elements of the system of the invention is shown. Digital informaiton in binary coded form is fed from digital computer 11 to high speed random access memory 12. Random access memory 12 may be incorporated with digital computer 11 or may be a separate unit and should have a total cycle time (read and restore) of about 1 microsecond, this to permit approximately 40 characters to be displayed in the horizontal scan time of a standard television receiver (approximately 53 microseconds). A standard magnetic core storage device may be utilized for —memory unit 12, a typical such device which will function satisfactorily being Model #MFAI fabricated by Fabri-Tek Co. The symbol information stored in memory 12 is transferred to symbol generator 17 in a predetermined sequence as determined by the particular address programmed into the memory. The address is advanced in response to the output of counter 15 which in turn is responsive to the output of timing generator 16. Timing generator 16, as to be explained further on in the specification, synchronizes the cathode ray tube scan of linear scan video display device 18 which may comprise a television receiver. The digital output of memory 12 is fed to symbol generator 17 where it is converted to a series of linear dot patterns which form the particular symbols represented by the information stored in the memory. The output of symbol generator 17 comprises a series of video impulses which are fed to the video circuits of video display devices 18 and appropriately displaced on the cathode ray tube of such display device.

Referring now to FIG. 2, a block diagram of a preferred embodiment of the device of the invention is shown. Synchronization signals are generated by sync generator 19 to provide both horizontal and vertical scan synchronization for video display device 18. Sync generator 19 may compromise a crystal controlled oscillator having output pulses at the horizontal and vertical scan frequencies of display device 18 (for a television receiver, 15,750 c.p.s. and 60 c.p.s. respectively). Horizontal synchronization signals 30 are also fed to flipflop 21 and drive stage **21*a* of this flipflop to the conductive state. When so driven, this flipflop provides an output pulse to delay line 20. Immediately after being so actuated, delay line 20 provides a pulse 32 to flipflop stage 21*b* and symbol counter 15. This pulse resets the flipflop so that stage 21*a* thereof goes to its non-conductive state and advances symbol counter 15 one count. Delay line 20 is chosen so that it has a delay time of 1 microsecond where used in conjunction with an ordiary television receiver which has a horizontal sweep time of about 53 microseconds; this one-microsecond delay providing the time for the readout of a single symbol. Feedback is provided from the output of the delay line through gate 22 to actuate flipflop stage 21*a* and thence to the input of the line, so that once the operation of the line has been synchronized with horizontal synchronization pulses 30, it will cause counter 15 to generate output pulses 31 spaced at one microsecond intervals. Counter 15 has a maximum count capacity corresponding to the number of symbols to be displayed in a scan line (e.g. 40). When this count is reached, an inhibit signal is fed to gate 22 from the counter which blocks the passage of further feedback signals from the output of the delay line to the input thereof. With the arrival, however, of the next horizontal synchronization pulse 30, delay line 20 receives an input pulse and a pulse 32 is fed to counter 15 to recycle this counter to its "zero" position thereby removing the inhibit signal from gate 22. In this manner, the presentation of information is synchronized with horizontal sync pulses 30**, the information for each scan line being presented in sequence.

The output pulses 31 from counter 15 control the addressing circuits of the memory and cause the memory to provide successive outputs to flipflop storage 35. Thus, in response to each of one microsecond spaced pulses 31, a symbol in binary coded form is read out of memory 12 onto storage device 35, the order of such successive readouts being in accordance with a predetermined program set up in the memory. As to be explained further on in the specification, this program successively repeats each of the symbols in a row of symbols to be displayed until all of the dot pattern lines in these symbols have been completed. In the preferred embodiment, each symbol is represented in a six-bit binary code.

The first two bits of flipflop storage device 35 are each fed to separate flipflop stages of flipflop readout unit 36 while the remaining flipflop outputs of storage unit 35 representing the remaining four bits of information are fed to separate flipflop stages of readout device 37. The outputs of readout device 37 are fed to translation gate 39 while the outputs of readout device 36 are fed to translation gate 40. Counter 41, which is a conventional flipflop binary counter, is driven by horizontal sweep synchronization signals 30 and thus provides an indication of the line being scanned in the cathode ray tube raster. Counter 41 counts up from 0 to 9 and then recycles, this covering the lines necessary for completing the dot patterns of the symbols (7 lines) with three additional lines being provided for spacing between rows of symbols. The binary coded output of counter 41 is fed from the flipflops thereof to flipflop readout device 42.

Thus, translation gate 39 receives four binary code bits partially representing the symbol being read out of memory 12 while translation gate 40 receives the remaining two bits for this symbol plus binary coded information indicating the line being scanned in video display device 18. Translation gates 39 and 40, as to be explained fully in connection with FIG. 3, utilizes logical gating to provide outputs indicative of the particular binary coded information fed thereto.

Each of the logical gating units of translation gate 39 is coupled to a particular driver unit of drivers 50, while each of the logical gating units of translation gate 40 is coupled to a unique diverter unit of diverters 52. Drivers 50 and diverters 52 may comprise conventional switching circuits utilizing diodes or transistors. Thus, for each particular combination of information read out of readout device 37, a particular driver unit of drivers 50 will be actuated, while for each particular combination of binary outputs from readout devices 36 and 42, a particular diverter unit will be actuated.

Video readout generator 55 receives the outputs of drivers 50 and diverters 52, and depending upon which particular diverter output occurs simultaneously with which particular driver output, generates a particular combination of impulses to flipflop stages **57*a*–57*e*; this combination being in accordance with the dot pattern of a single line of the particular symbol being read out of memory 12. The outputs of flipflops 57*a*–57*e* are fed to gating means 60 where, as to be explained more fully in connection with FIG. 4, they are sequentially gated to video amplifier 61 in response to sequential timing outputs of delay line 20. The output of gating means 60 is in the form of a series of video pulses representing the dots forming the symbols to be displayed, and these video signals are fed to the video stages of video display device 18** where they appear at appropriate positions on the cathode ray tube raster.

Referring now to FIG. 5, the dot pattern generation utilized in the device of the invention is illustrated. Cathode ray tube raster 60 is formed by a plurality of sequential scan lines 61 which are formed by an electron beam controlled by horizontal and vertical deflection circuitry. Raster 60 is a conventional scanning raster such as formed in an ordinary television picture tube. Symbols 63 and 64 which are indicated for illustrative purposes as the letters A and B respectively, are formed by a series of dots 65 which are generated by providing a video signal to the cathode ray tube at appropriate portions of the sweep scan lines 61. As can be seen, the symbols are formed in seven successive sweep lines and with five discrete horizontal dot spaces. In a working embodiment of the device of the invention, these dot spaces represent one microsecond of sweep time of the electron beam. Thus, for example, as can be seen, in the first sweep line there is no video signal during the first ⅙ microsecond, with a signal appearing during each of the next three succeeding ⅙ microsecond spaces, followed by another video blank to form the first line of the symbol A. Following this, there is another blank space followed by four video impulses to form the first line of the symbol B. The first lines of subsequent symbols (not shown) would follow in similar fashion until the end of the sweepline was reached at which time, the second line of dot patterns for the symbols A and B and other subsequent symbols are formed in similar fashion, and so on, until all seven lines of each of the symbols have been written on the face of the video tube.

The images so formed are retained on the face of the tube by virtue of the repetitive vertical sweep of the television display at the rate of sixty times per second. It is to be noted also that the first line of all of the symbols in each row are first displayed followed by the second line of all of such symbols until finally all of the lines of the symbols in the row have been completed.

With the dot display patterns of FIG. 5 in mind, let us now refer to FIG. 3 which illustrates the operation of the translation gating and drive circuitry utilized to convert the binary coded information to video signals for generating the desired dot patterns. For illustrative purposes, circuitry is shown in FIG. 3 for generating line 1 of symbol A, line 2 of symbol A and line 2 of symbol B.

The binary code utilized to represent the symbol A in an operative embodiment of the device of the invention is 011010 while B is represented by 100011. Let us assume that the symbol A is being read out of the memory and is being fed from flipflop storage unit 35 to flipflop readout devices 36 and 37. When the flipflop readout devices are actuated in accordance with the binary code for A (011010), AND gate 39*b* of translation gate 39 will have all of its inputs for a TRUE output, this being provided by the last four bits for A (0110) which appears at the outputs of the flipflop stages of flipflop readout 37. AND gate 39*b* will under such conditions provide a TRUE output to driver 50*a*. At the same time, AND gate 40*a* will be driven to a TRUE condition by the outputs of the flipflop stages of readout flipflop 36 which carries the first two bits of the A code (01), gate 40*a* also receiving the line count signal for the first scan line (000) from the flipflop stages of flipflop readout device 42. Thus when at scan line number one and symbol A AND gates 39*b* and 40*a* will uniquely be actuated to in turn actuate driver 50*a* and diverter 52*a* respectively. Driver 50*a* is connected to wire 60 which passes through cores 55*b*, 55*c* and 55*d* but does not pass through cores 55*a* and 55*e* of magnetic readout generator 55. When driver 50*a* and diverter 52*a* are simultaneously actuated, which only occurs when the symbol A and line 1 signals are present, a current path is provided from current source 62 through driver 50*a*, wire 60 and diverter 52*a*. This generates current readout signals in windings 55*g*, 55*h*, 55*i*. As to be explained in connection with FIG. 4. this povides the three signals for generating the dot pattern of the first line of the symbol A. When the symbol A is present during the second sweep line, AND gate 39*b* and driver 50*a* operating in conjunction with AND gate 40*b* and diverter 52*b*, operate to provide a current on line 65 which generates a signal corresponding to the second line of the symbol A (see FIG. 5) in windings 55*f* and 55*j*. The second line for symbol B is similarly provided by simultaneous TRUE outputs from AND gates 39*a* and 40C when the binary code for B (100011) appears; this simultaneously actuating driver 50*b* and diverter 52*c* to provide a current through line 67 to provide a signal in windings 55*f* and 55*j*. So also all of the line patterns for each of the symbols to be displayed are generated by separate wires (not shown) running in an appropriate fashion through the cores of magnetic readout device 55 and actuated in response to separate combinations of AND gates and associated drivers and diverters, such as AND gates 39*c* and 40*d*, driver 50*c* and diverter 50*b*. In this fashion, each of the separate dot pattern lines of each of the symbols stored in digital form in the memory is generated.

Referring now to FIG. 4, circuitry for generating the video readout signal is illustrated. Each of the windings 55*f*–55*j* of magnetic readout device 55 is connected to a separate flipflop 70*f*–70*j* respectively. The output of each of flip-flops 70*f*–70*j* is in turn connected to an associated one of AND gates 72*f*–72*j*. When there is a current in any one of windings 55*f*–55*j*, the flipflop associated with that winding will provide a TRUE output to its associated AND gate. As already explained in connection with FIG. 2, delay line 20 is initially actuated in response to horizontal sync pulse 30 and generates an output pulse 31 one microsecond later. Output pulses 31 are fed back to the input of the delay line through flipflop 21 so as to produce pulses 31 at one microsecond intervals. A tapped output is provided from delay line 20 on line 75*e* to reset flipflop 21 immediately after the delay line receives an input pulse from the flipflop. Delay line 20 is further tapped to provide consecutive pulse outputs on lines 75*f*–75*j* at equal fractional portions of a microsecond, such consecutive signals being fed to AND gates 72*f*–72*j* respectively. Thus AND gates 72*f*–72*j* will produce TRUE outputs in consecutive order when they are in turn receiving TRUE outputs from their associated flipflops 70*f*–70*j*. The outputs of AND gates 72*f*–72*j* are fed to OR gate 77 which in turn feeds the video signals received thereby to video amplifier 61. In this manner, the dot patterns for each of the lines of the symbols are consecutively generated and fed to the video circuits of the display device.

The system of this invention thus provides highly effective means for converting digital information in binary coded form to a dot pattern form for display on the screen of an ordinary television receiver.

I claim:

1. In combination, high speed random access memory means for storing binary coded information representing a plurality of symbols, a linear scan video display device having a plurality of scan lines, means for converting the binary coded information stored in said memory means to dot pattern form for display on said video display device comprising a magnetic core device having separate core readout elements each for generating corresponding dots of scan lines of symbols to be displayed, said core device having a separate input wire for each scan line of the symbols to be displayed, each of said wires being coupled to those readout elements defining the dot pattern of its associated symbol scan line and translation gate means for sequentially energizing the input wires associated with the lines of the symbols represented by the binary coded information, and means for coupling said dot pattern information to said video display device for display thereon in a predetermined sequence and in synchronization with the scan lines of said display device.

2. The combination as recited in claim 1 wherein said translation gate means comprises a plurality of logical gates, each of said gates being connected so as to generate a control signal for actuating said readout generator only in response to a single predetermined binary coded signal representing a particular symbol.

3. The combination as recited in claim 1 wherein said means for coupling said dot pattern information in a predetermined sequence comprises a delay line synchronized with the scan of said display device, said delay line having a plurality of timing outputs thereon, each of said timing outputs being connected to control the coupling of one of said readout elements to said display device.

4. The combination as recited in claim 1 wherein said means for coupling said dot pattern information in synchronization with the scan of said display device includes a timing generator for providing synchronization signals to synchronize the scan of said display device and the conversion of said binary coded information to dot pattern form.

5. In a device for converting binary coded digital information to dot pattern form for video display, a high speed random access memory for storing binary coded information representing a plurality of symbols, a linear scan video display device, and a symbol generator means for converting said binary coded information to dot pattern form and coupling the dot patterns to said video display device comprising:

means for reading the information out of said memory in a predetermined sequence and a predetermined timing relationship with the scan of said display device, translation gate means for receiving the binary coded information as it is read out of said memory and providing a separate distinct output corresponding to each of the separate information codes, and video readout generator means responsive to the output of said translation gate means for generating a dot pattern output in accordance with the signals received from said translation gate means, the output of said video readout means being coupled to said video display device, said video readout generator means including a magnetic core device having separate core readout elements each for generating corresponding dots of scan lines of symbols to be displayed, said core device having a separate input wire for each scan line of the symbols to be displayed, each of said wires being coupled to those readout elements defining the dot pattern of its associated symbol scan line, each of the separate outputs of the translation gate means being fed to one of said wires.

6. The device as recited in claim 5 wherein said means for reading the information out of said memory in a predetermined timing relationship comprises a timing generator for generating synchronization pulses, means for coupling said synchronization pulses to said video display device to synchronize the scan thereof and means for actuating the address of said memory in synchronization with said pulses.

7. The device as recited in claim 6 wherein said means for actuating the address of said memory comprises symbol counter means for counting the number of symbols to be displayed in each scan line, said symbol counter means providing an output to the address of said memory for each symbol to be displayed.

8. The device as recited in claim 5 wherein said translation gate means comprises a plurality of logical gates, each of said gates being connected to generate a control signal for said readout generator means only in response to a separate one of the information codes.

References Cited

UNITED STATES PATENTS

| | | | |
|---|---|---|---|
| 3,012,240 | 12/1961 | Klahn | 340—347 |
| 3,175,208 | 3/1965 | Simmons | 340—324 |
| 3,241,120 | 3/1966 | Amdahl | 340—324 |
| 3,345,458 | 10/1967 | Cole et al. | 340—324 |
| 3,388,391 | 6/1968 | Clark | 340—324 |

THOMAS B. HABECKER, Primary Examiner

M. M. CURTIS, Assistant Examiner

U.S. Cl. X.R.

340—174